United States Patent [19]

Tuggle

[11] 4,286,675

[45] Sep. 1, 1981

[54] NARROW PROFILE POWER HANDLE FOR LINE TRIMMER AND THE LIKE

[75] Inventor: Lloyd H. Tuggle, Shreveport, La.

[73] Assignee: Beaird-Poulan Division of Emerson Electric Co., Shreveport, La.

[21] Appl. No.: 51,950

[22] Filed: Jun. 25, 1979

[51] Int. Cl.$^3$ .......................... E21B 7/22; E21B 3/00
[52] U.S. Cl. ............................. 173/163; 173/DIG. 2; 30/347; 30/276; 181/204; 64/11 R; 56/12.7
[58] Field of Search ................. 173/163, 170, DIG. 2; 123/198 E; 30/296 R, 276, 347; 181/204; 56/12.7; 64/11 R; 403/342, 341; 192/103 B, 105 BA

[56] References Cited

U.S. PATENT DOCUMENTS

| | | | |
|---|---|---|---|
| 2,219,883 | 10/1940 | Amtsberg | 192/103 B |
| 3,036,566 | 5/1962 | Dobbertin | 123/198 E |
| 3,140,746 | 7/1964 | Force | 173/170 X |
| 3,361,165 | 1/1968 | Irgen | 192/103 B X |
| 3,404,749 | 10/1968 | Miller et al. | 181/240 |
| 3,459,269 | 8/1969 | Hunter et al. | 173/170 |
| 3,616,867 | 11/1971 | Celli | 173/163 |
| 3,665,712 | 5/1972 | Tenney | 181/240 X |
| 3,823,474 | 7/1974 | Ionescu | 173/170 |
| 3,844,360 | 10/1974 | Green et al. | 173/170 |
| 3,958,680 | 5/1976 | Armbruster et al. | 192/103 B X |
| 3,990,523 | 11/1976 | Schramm et al. | 173/163 |
| 4,046,481 | 9/1977 | Horvath | 403/342 |
| 4,148,141 | 4/1979 | Hoff | 30/276 X |
| 4,160,608 | 7/1979 | Derner et al. | 403/342 |
| 4,188,719 | 2/1980 | Hoff | 30/276 X |

*Primary Examiner*—Ronald Feldbaum
*Attorney, Agent, or Firm*—Hubbard, Thurman, Turner, Tucker & Glaser

[57] ABSTRACT

A narrow profile power handle uniquely adapted for use as a flexible line trimmer having improved handling and safety features is disclosed. The power handle is also equipped with a quick connect and disconnect coupling and is useful for driving attachments to produce hand held rotary implements and tools such as brush cutters, edgers, cultivators, drills, etc., hand held reciprocating implements and tools such as hedge clippers, saws, etc., as well as portable water pumps, air compressors, generators, etc.

The crankshaft of a two-stroke internal combustion engine is disposed along the longitudinal axis of a narrow profile housing which includes a rear handle having a hand grip portion disposed above and projecting rearwardly parallel to the axis of the housing. The cylinder extends upwardly from the crankcase, the carburetor is disposed below the crankcase, the flywheel, ignition system and starter to the rear, and the gas tank is disposed below the rear handle. The muffler is disposed along the forward face of the housing for discharging products of combustion forwardly of the housing and away from the operator, thereby permitting the assembly to be rotated for various trimming operations without exposing the operator to the risk of burn injury. A recoil starter handle, a choke control, throttle control and ignition kill switch are conveniently clustered around and near the hand grip portion of the rear handle which allows the operator to observe and exercise positive control over both the power handle and the cutter head while starting and operating the engine. The power handle includes a quick disconnect coupling for attaching the portable power unit to drive various attachments. As a result of this arrangement, the power handle is generally symmetrical about the longitudinal vertical plane and is of minimum width.

The drive shaft of the line trimmer assembly is aligned with the crankshaft of the engine and a forward handle is disposed above the drive shaft ahead of the engine housing. As a result, the center of gravity of the overall line trimmer assembly is below and between the forward and rearward handles, thereby providing improved balance and maneuverability.

39 Claims, 13 Drawing Figures

NARROW PROFILE POWER HANDLE FOR LINE TRIMMER AND THE LIKE

BACKGROUND OF THE INVENTION

1. Field of the Invention

This invention relates generally to portable power tools, and in particular to a manually operated internal combustion power handle assembly and to attachments thereto to produce line trimmers, lawn edgers, brush cutters, tillers, hedge trimmers, power hacksaws, chain saws, water pumps, generators, air compressors, blowers, vacuums and the like.

2. Description of the Prior Art

It is well known in the prior art to provide two-stroke internal combustion engines or electric motors for driving portable machinery such as chain saws, lawnmowers, flexible line trimmers and the like. Various attempts have been made to adapt internal combustion engines for portable power tools which have a rotary head such as a brush cutter or flexible line trimmer. In the typical prior art arrangement, the rotary head of the power tool is connected by means of a drive shaft enclosed within a long tubular housing and is connected in driving relation at the opposite end to the internal combustion engine. The engine is typically mounted in such a manner that the engine is laterally offset relative to the drive shaft or is supported behind the operator when in use. This makes the engine extremely awkward to start, and requires that the operator must either set the unit on the ground to start it, or try to reach back over his shoulder and start it, or maneuver it as best he can with both hands to start it. Furthermore, in those units in which the engine is mounted in the rear, and the operator's hands are placed forward of the engine, a separate throttle arrangement and handle must be installed with a control cable leading back to the engine to control the throttle valve. This has resulted in loose wires moving about and becoming entangled in brush resulting in damage to the assembly.

Attachments for chain saws have been proposed to provide flexible line trimmers, etc. However, because of the offset drive shaft arrangement for the typical two-stroke chain saw engine, an adaptor must be provided to transmit power to the flexible drive shaft through a ninety degree gear box. This results in increased weight and cost because of the requirement for chain, sprockets and gear box. These attachments have not been well accepted.

Another difficulty encountered in adapting a conventional chain saw two-stroke engine for powering a portable tool such as a line trimmer is that the chain saw engine is designed primarily for relatively high speed, low torque cutting operations, while applications such as line trimmers require relatively high torque, low speed operation. Therefore, the typical chain saw two-stroke internal combustion engine is not ideally suited for such applications, and such use tends to result in shortened engine life.

A problem incidental to adapting a chain saw engine for line trimmer applications and the like is the location of the muffler mounted on one side of the engine housing which limits the option of the operator for using the assembly in either right or left handed operation. This side mounted muffler configuration also results in a potentially dangerous situation when the unit is rotated ninety degrees so that it can be used for lawn edging.

Finally, when the engine is disposed behind the operator when in use, the center of gravity of the assembly is typically behind and above the operator's hands, thereby making the assembly very awkward to maneuver.

OBJECTS OF THE INVENTION

It is therefore a general object of the invention to provide an improved internal combustion power handle which will eliminate or minimize problems of the type previously described, and which is a universal power pack that can be used in combination with a number of attachments to accomplish specific functions or tasks, and to provide certain specific attachments for use with the power handle.

It is another object of the present invention to provide an improved power handle assembly of the type suitable for driving a rotary head through an elongated drive shaft wherein the drive motor enclosed within the power handle housing is supported between the operators hands with center of gravity for the assembled unit below the operator's hands to thereby improve balance and maneuverability of the unit.

It is another object of the present invention to provide a line trimmer of the type including a rotary head, an elongated tubular drive shaft assembly, and a drive motor enclosed within an elongated, narrow profile housing and supported intermediate and below forward and rear handles for improved balance and maneuverability.

Another object of the present invention is to provide a power handle having a universal coupling by which a specific attachment can be easily and quickly connected to the power handle to produce a special purpose tool.

Another object of this invention is to provide several special purpose attachments for the power handle of the present invention.

It is still another object of the present invention to provide an improved power handle assembly having an internal combustion engine which includes a forward mounted muffler for discharging products of combustion forward of the engine and away from the operator.

It is another object of the present invention to provide a power handle assembly, including an internal combustion engine, enclosed within an elongated housing having a rear handle and including a recoil starter assembly having a pull cord projecting through the housing at a point which will permit the engine to be started while being held in front of the operator.

It is still a further object of the present invention to provide a power handle assembly for driving a rotary head through an elongated tubular drive shaft assembly including an elongated housing enclosing the internal combustion engine having a rear handle and engine controls mounted on the housing in such a manner that the engine can be controlled with the same hand that is used to grip the rear handle without releasing the grip.

It is another object of the present invention to provide a narrow profile power handle assembly which permits direct in-line drive of an elongated tubular drive shaft assembly and which in combination with a rotary head and drive shaft assembly provides an overall center of gravity which is forward and below the rear handle.

It is a related object of the present invention to provide an improved cooling air circulation arrangement for an internal combustion engine enclosed within a narrow profile power handle housing.

It is still another object of the present invention to provide an improved system for quickly and conveniently connecting and disconnecting various attachments to a power handle, and for adjusting the relative position between the attachments and the power handle.

SUMMARY OF THE INVENTION

The foregoing and other objects are provided by a narrow profile power handle comprising a power unit enclosed within a power handle housing which is especially adapted for driving a rotary tool supported by an elongated drive shaft assembly coupled to the power unit. According to one aspect of the invention, the power handle includes an elongated housing enclosing the drive unit having a rear handle including a hand grip portion disposed above and projecting rearwardly parallel to the drive shaft of the drive motor. In this arrangement, the drive shaft of the power unit extends along the longitudinal axis of the elongated housing, and the tubular drive shaft assembly includes a connecting tubular portion concentrically aligned with the drive shaft of the power unit. This arrangement results in a center of gravity for the assembly which is below and forward of the operator, thereby improving balance and maneuverability. The power handle is preferably used in combination with a forward handle attached to and disposed above the tubular drive shaft assembly of a flexible line trimmer, brush cutter, or similar attachment.

According to another important aspect of the invention, the drive unit comprises a two-stroke internal combustion engine having a muffler disposed along the forward face of the housing for discharging products of combustion forwardly of the housing and away from the operator, thereby permitting the assembly to be rotated for various trimming operations without exposing the operator to the risk of burn injury.

According to another important aspect of the preferred embodiment of the invention, a recoil starter handle, a choke control throttle control and ignition kill switch are conveniently clustered around and near the hand grip portion of the rear handle which permits the operator to observe and exercise positive control over both the power handle and the rotary head while starting and operating the engine. This particular arrangement of the recoil starter assembly permits the engine to be started while being held in front of the operator. Thus the engine can be controlled with the same hand that is used to grip the rear handle without releasing the grip.

According to another important feature of the preferred embodiment, the internal combustion engine includes a crankshaft having a longitudinal axis extending along the length of the housing and a piston projecting upwardly at right angles with respect to the crankshaft wherein the crankshaft, piston and control handle are substantially disposed in the plane defined by the intersection of the longitudinal axis of the piston and the axis of the crankshaft. This arrangement results in an elongated power handle assembly having a relatively narrow, symmetrical profile which is particularly appropriate for the rear handle-forward mounted drive unit arrangement for improved balance and maneuverability, and either left-handed or right-handed use.

According to yet another important aspect of the invention, ventilation air is drawn through ventilation openings formed in the housing generally behind the power take-off and cooling air is circulated around the power cylinder of the internal combustion engine and is discharged through ventilation discharge openings formed around the muffler by the housing so that engine cooling air is drawn through the inlet openings by a fan attached to the crankshaft and is discharged around the cylinder and around the muffler through the ventilation discharge opening in response to rotation of ventilation blades connected to the crankshaft. The engine cooling air is also mixed with the exhaust gases from the muffler just inside the housing so that the exhaust gases are significantly cooled before leaving the housing.

In accordance with another important aspect of the invention, an improved muffler is provided wherein the exhaust gases from the piston pass along a tube axially aligned with the piston exhaust port, then impinge upon a plate which stands off from the end of the tube to form a peripheral venturi cooling port, then pass outwardly through a concentric perforated cylinder to the muffler housing, then is jetted toward the exit from the engine housing where it is mixed with and assists in pumping the cylinder cooling air from the engine housing, thus providing a combined air stream leaving the main housing that is relatively cool.

In accordance with another important aspect of the invention, an inline power transfer coupling, including a centrifugal clutch, is provided which is mounted directly on an extension of the crankshaft of the internal combustion engine. This is achieved by fixing the centrifugal shoe unit of a centrifugal clutch directly on the crank shaft while journaling the drum unit on a bearing on the crank shaft outboard of the shoe unit. A square drive socket is connected to the drum unit and receives the driven shaft of an attachment. The housing includes threads by which an attachment can be coupled rigidly, but detachably, to the housing to form a useful, special purpose implement.

In accordance with another important aspect of the invention, a plurality of special purpose implements are disclosed which may be used in conjunction with the general purpose power handle assembly.

The foregoing and related objects and advantages of the present invention will become more apparent from the following specification, claims, and appended drawings wherein:

BRIEF DESCRIPTION OF THE DRAWINGS

FIG. 11 is a simplified sectional view similar to FIG. 5 which illustrates the manner in which the rotary motion from the power handle assembly of FIG. 4 can be converted to reciprocating motion useful for saws, hedge clippers and the like;

DETAILED DESCRIPTION OF THE PREFERRED EMBODIMENTS

In the description which follows, like parts are marked throughout the specification and drawing with the same reference numerals, respectively.

The drawings are not necessarily to scale and in some instances, structural portions have been exaggerated in order to more clearly depict certain features of the invention.

Figure 1:
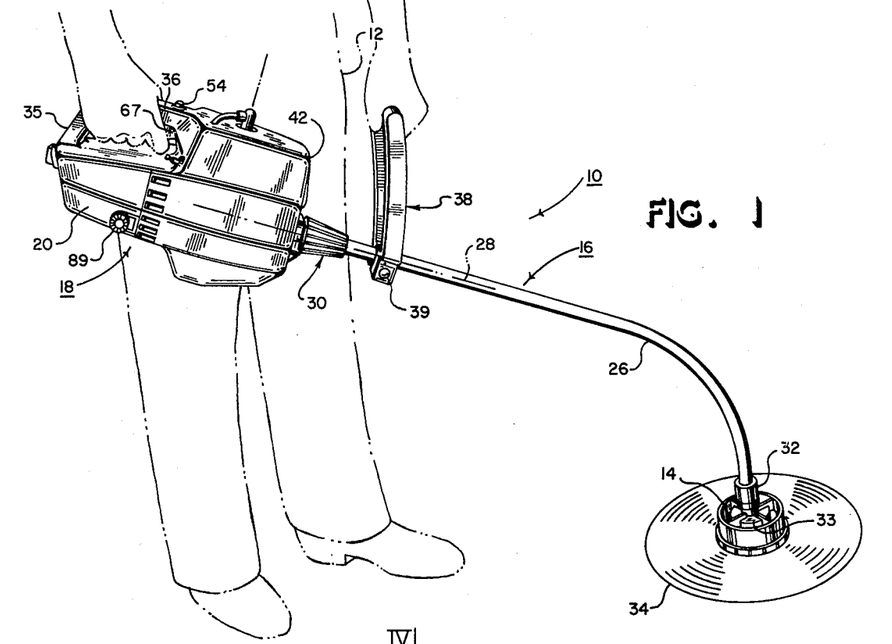
FIG. 1 is a perspective view showing an operator holding a portable line trimmer and power handle assembly constructed according to the teachings of the present invention.

The invention will be described in connection with a preferred embodiment of a gas engine powered line trimmer assembly 10 as shown in FIG. 1. However, the inventive features are generally applicable to a number of different uses wherein the rotary head is fitted with a blade or other rotary implements such as commonly used for edgers, brush cutters, mini-tillers, snow blowers, circular saws, chain saws, water pumps, generators, air compressors, etc., and for reciprocating implements such as power hacksaws, hedge clippers and the like. Therefore for purposes of illustration, and not of limitation, the preferred embodiment of a filament type, flexible line trimmer will be described in detail for illustration of the novel features of the invention.

Referring again to FIG. 1, the flexible line trimmer 10 is a portable, lightweight assembly which is easily manipulated by an operator 12 for trimming grass and weeds growing close to walls, fences, walks, shrubs, and trees, where access with a conventional lawn mower is awkward or impossible. The line trimmer assembly 10 includes a rotary cutter head 14 which is coupled to the lower end of an elongated tubular drive shaft assembly 16. Coupled in driving relation on the upper end of the drive shaft assembly 16 is a power handle assembly 18. As used in this specification, the term "power handle assembly" shall include a drive motor having a fitting for transmitting power through a rotatable shaft and the housing enclosing the drive motor.

Referring now to FIGS. 1-4, the power handle assembly comprises a housing 20 which encloses the crankcase 76 for an engine 22. The engine 22 is preferably a gasoline powered, two-stroke, crankcase scavenged, internal combustion engine designed and capable of delivering relatively high torque at relatively low speeds during extended or continuous operation without reducing the expected or normal engine life. Power developed by the internal combustion engine 22 is transmitted to the rotary cutter head 14 by means of a flexible drive shaft 24 (see FIG. 4) which is enclosed within a tubular housing 26. The tubular housing 26 is relatively long as compared to the length of the power handle and is slightly curved at its end to maintain the cutter head 14 at a preferred cutting angle with respect to the longitudinal axis 28 of the upper drive shaft housing and power handle assembly. The tubular drive shaft housing 26 is coupled at its upper end to the power handle assembly by an upper coupling assembly 30 and at its lower end by a lower coupling assembly 32. The lower coupling assembly 32 preferably includes a sealed antifriction bearing (not illustrated) and the upper portions of the flexible drive shaft 24 are preferably stabilized against the tubular drive shaft housing by a continuous sleeve bearing 57.

As illustrated in FIG. 1, the rotary cutter assembly 14 is preferably a vegetation cutter comprising a rotary spool 33 that carries a length of cutting line 34 such as monofilament nylon. As the cutting line 34 whirls around at high speed, it cuts grass and weeds by the inertia of the tip of the line. As the cutting line 34 breaks or frays, additional line is payed out from the spool. This is achieved by pulling more line out from the spool 33 and cutting it to the correct length. The rate at which the line frays and wears away will depend upon the type of trimming being done. Line wear will occur most rapidly when trimming around rocks, walls and fence posts, and along a graveled walk or driveway.

Figure 4:
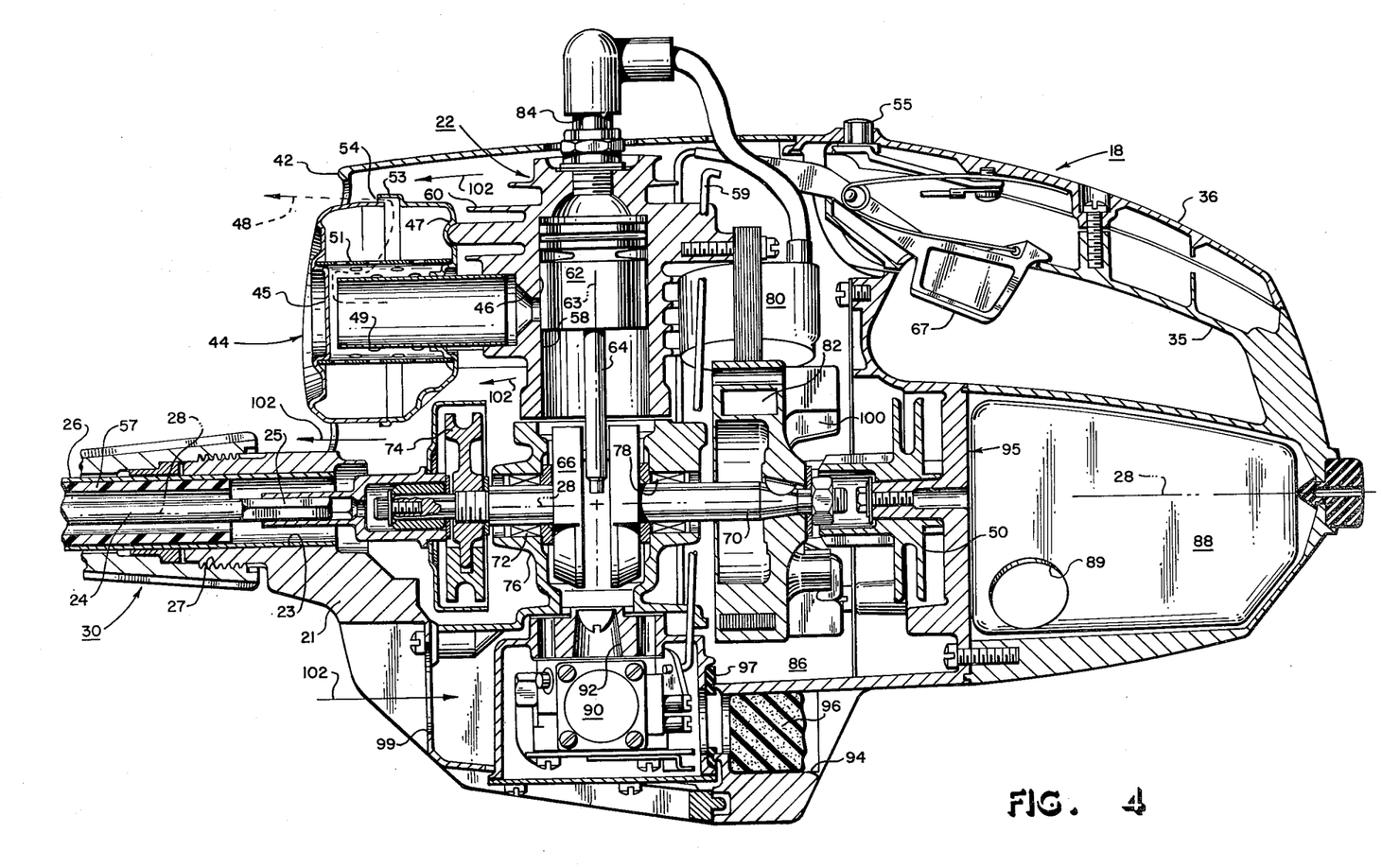
FIG. 4 is a sectional view, partly in elevation, taken along line IV—IV of FIG. 2.

Referring now to FIG. 4 of the drawing, the internal combustion engine 22 is a two-stroke air cooled assembly which includes a cylinder 58 provided with a plurality of circumferentially disposed cooling vanes 100. A piston 62 having a longitudinal axis 63 is mounted for reciprocal movement within the bore of the cylinder in the conventional manner and is coupled through a connecting arm 64 to a crank arm 66. The connecting arm 64 is journaled for rotation on the crank arm 66 by a conventional bearing assembly. According to this arrangement, reciprocal movement of the piston 62 within the bore of the power cylinder 58 is translated into rotation of a crankshaft 70.

The forward end of the crankshaft 70 extends through a conventional needle bearing 72 mounted in the crankcase 76 of the engine. The crankcase is mounted in the housing 20. The forward end extends to and supports a centrifugal clutch 74, which operatively connects the crankshaft 70 to the coupling 30 and thus to the flexible drive shaft 24, as hereafter more specifically described. The rear end of the crankshaft 70 is mounted in the crankcase 76 by needle bearing 78 and extends to a position adjacent a hand operated recoil starter assembly 50. The crankshaft 70 is engaged by the recoil starter assembly 50 in the conventional manner for cranking the engine during a starting operation. Also attached to the rear end of the crankshaft 70 is a conventional flywheel 82 which is magnetically coupled to a solid state ignition module 80 for developing ignition current. The ignition current is applied in the conventional manner to the electrodes of a spark plug 84.

According to an important feature of the invention, the crankshaft 70, the piston 62 and the control handle 35 are substantially disposed in the plane defined by the intersection of the axis 63 of the piston and the axis 28 of the crankshaft 70. In addition, the carburetor 90 is disposed below the crankcase 76 and in the plane, and the muffler 44 is disposed in front of the piston, also in the plane. This arrangement results in an elongated power handle assembly 18 having a relatively narrow profile. The housing 20 of the power handle assembly 18 includes a rear handle 35 having a hand grip portion 36 disposed above and projecting rearwardly generally parallel to the longitudinal axis 28 of the power handle assembly. Additionally, a forward handle 38 is adjustably clamped at any desired point and angle around the drive shaft housing 26 by a fastener 39. The forward handle 38 includes struts 38a, 38b supporting a hand grip portion 40 disposed generally above the forward face 42 of the power handle housing 20 (see FIG. 3). One very important advantage of this arrangement is that the center of gravity for the overall line trimmer assembly 10 is located between and below the rear control hand grip 36 and forward hand grip 40 thereby distributing the weight between the handles while the pendulum effect improves the stability and maneuverability of the assembly. Additionally, since the engine and drive shaft housing 26 are symmetrical about the vertical plane defined by axes 28 and 63, the unit hangs directly below the handles without any lateral imbalance. Further, the unit may be used substantially equally either right-handed or left-handed. This particular arrangement having a center of gravity forward of the operator and between and below the two handles, and an in-line power takeoff, is particularly useful for an internal combustion engine unit, but may also be used to advantage in an electric motor unit.

An improvement relating to operator safety is realized in a preferred embodiment of the internal combustion engine 22 by discharging products of combustion forward of the engine, and thus forwardly away from the operator. This is carried out as seen in FIGS. 3 and 4 of the drawing by connecting a muffler 44 to the exhaust port 46 of the internal combustion engine in such a manner that the muffler 44 projects toward and partially through the forward face 42 of the housing for discharging products of combustion forwardly of the engine and operator as indicated by the arrow 48.

Figure 3:
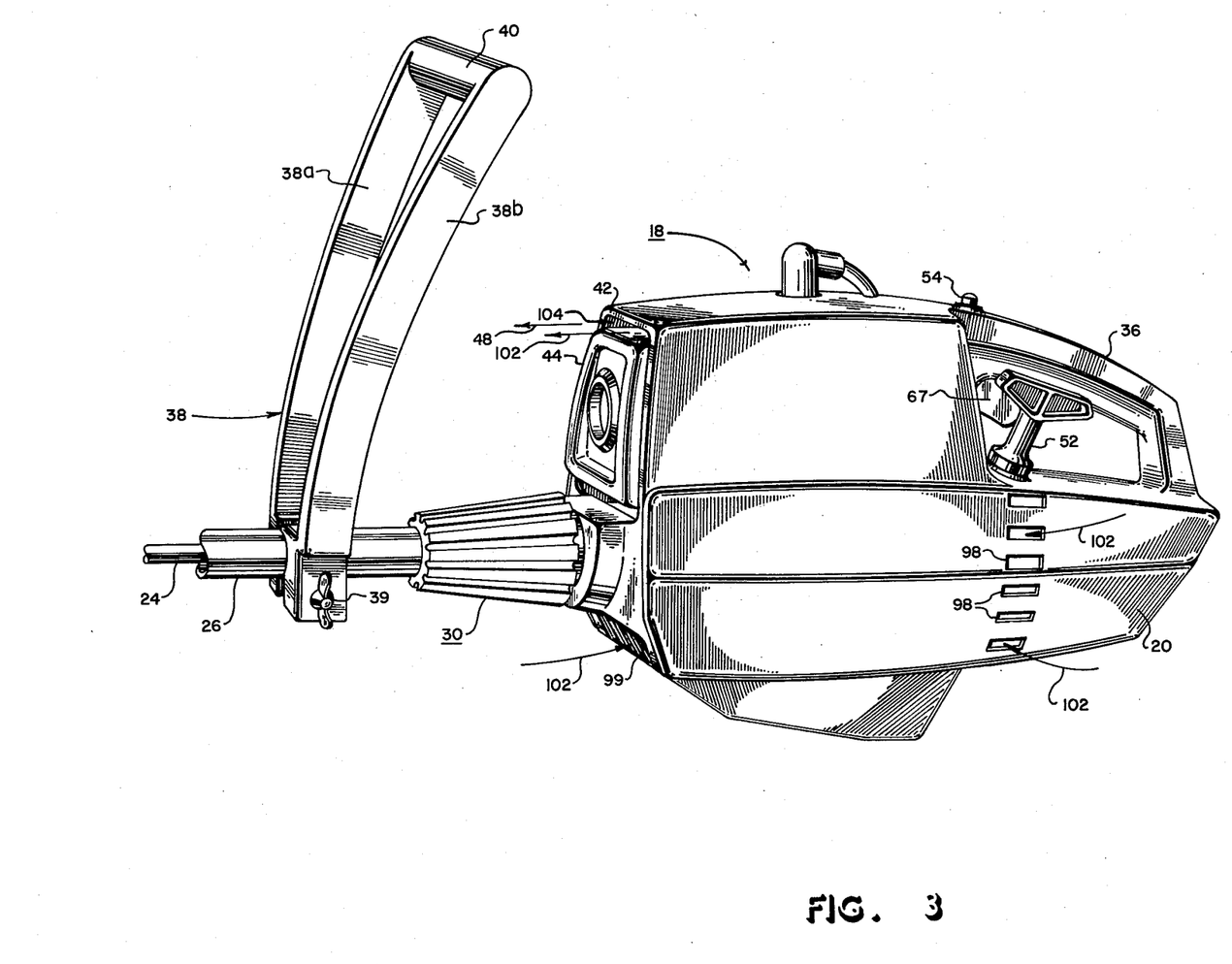
FIG. 3 is a left front perspective view of the power handle assembly shown in FIG. 1.

Referring now to FIGS. 3 and 4, a plurality of blades are secured to the flywheel assembly 82 and forms a centrifugal fan 100. A number of ventilation openings 98 are formed along the sides of the housing 20 generally rearwardly of the fan 100 and another opening 99 is formed in the front lower portion of the housing. The fan 100 pulls ventilation air in through the ventilation openings 98 and through opening 99, and forces the air around the cylinder 58 and out through an annular discharge opening formed intermediate the muffler 44 and the housing. The path of flow of cooling air is indicated generally by the arrows 102. In accordance with another aspect of the invention, the ventilation air passes around the muffler to cool the muffler and is mixed with the exhaust gas from the muffler to reduce the temperature of the exhaust gases before the exhaust gases leave the housing.

The muffler 44 is comprised of mating front and rear halves 45 and 47, respectively, a solid inner tube 49, and a perforated sleeve 51 disposed around tube 49. The tube 49 is secured within an opening in the rear half 47, and is received in a bore in the cylinder 58. The sleeve 51 extends between bosses formed on the front and rear halves 45 and 47 of the muffler. The interior tube 49 extends from a bore in the cylinder casting which is in fluid communication with exhaust port 46, and extends to close proximity with a flat wall formed by the front half 45. This forms a venturi-like restriction having a smaller cross sectional area than tube 49 and results in a reduction of pressure within the tube 49 due to the "tuned" port effects produced by the inertia of the higher velocity gases passing through the venturi and thus cools the gases. The gas is then passed through the perforated sleeve 51 and exits through a directed jet formed by intermittent gaps 54 between the skirt 53 of the rear half 47 and the edge of the front half 45. The point at which the exhaust gas represented by arrow 48 leaves the muffler ports formed by the skirt 53 is sufficiently set back from the front face 42 forming the annular opening around the muffler, that the comingling of the ventilation gases represented by the arrow 102 from the fan blades 100 reduces the combined temperature to a relatively modest level. This combined with the distance to the hand holding the front handle 38 is such that no noticeable discomfort is evident during operation.

As a result of this arrangement, the muffler 44 is out of the way so that it cannot burn the operator 12. The direction of the exhaust discharge is forward of the power handle and operator so that the power handle assembly can be rotated to any position about the longitudinal axis 28 without risk of burn injury to the operator or unpleasant exhaust gases being directed into the operator's face. Additionally, the assembly can be utilized equally well by either right or left handed operators without risk of burn injury. Since the muffler 44 cannot directly contact the ground, this forward discharge arrangement helps prevent fires when the unit is rested on a grassy surface.

Figure 2:
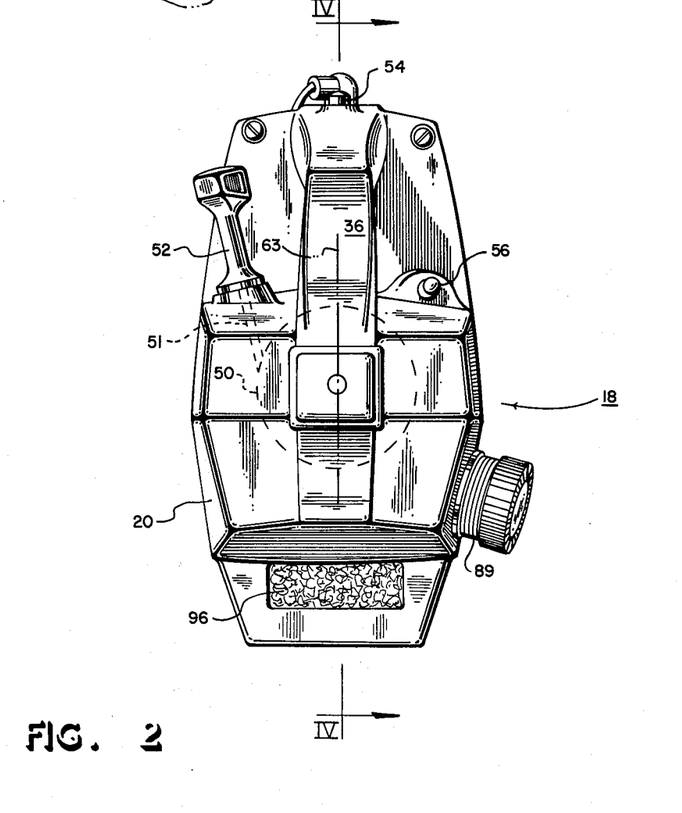
FIG. 2 is a rear elevation view of the power handle shown in FIG. 1.

Referring now to FIGS. 2, 3 and 4, the engine 22 is provided with a recoil starter assembly 50 as previously mentioned. The starter includes a pull cord 51 and handle 52 projecting through the housing 20 at a point above the longitudinal axis 28 but below and laterally to one side of the rear hand grip 36. This arrangement greatly simplifies starting the engine since the control hand grip 36 can be held in the right hand for stabilizing the line trimmer assembly 10 in front of the operator while the left hand grasps and pulls the handle 52. It is important that the operator observe and maintin control over the position of the rotary head at all times during starting in order to avoid personal injury or accident. Additionally, it is important that starting be very easy to accomplish since the unit is light enough that it will be used by women and children.

Referring again to FIG. 4, the internal combustion engine 22 is provided with a carburetor 90 coupled in fluid communication with a scavenging supply inlet port 92. The housing is provided with a combustion air intake port 94 to the rear of the carburetor and below the fuel tank and a removable air filter 96 is disposed in the port. The port 94 is sealed to the carburetor housing by a resilient gasket 107 to ensure that the only air entering the engine has first passed through the filter. Because of the location of the air filter 96, it is convenient for the operator to determine when the filter is dirty and should be cleaned, and to then clean and/or replace it.

The rear control handle-forward engine configuration of the invention permits a cluster of control elements including an ignition kill switch 55, a choke control 56 and a throttle lever 57 near the hand holding the rear handle. The throttle lever 57 is mounted for pivotal movement relative to the hand grip 36 for controlling the speed of the engine in response to hand grip pressure. Pivotal movement of the throttle lever 57 is transmitted to a throttle valve in the carburetor 90 by means of linkage 59. The manually operated choke control 56 (see FIG. 2) and ignition kill switch 55 are conveniently located near the rear hand grip 36 in positions which are easily accessible for fingertip manual control so that the operator can set the choke control, actuate the ignition kill switch, or adjust the throttle without removing either hand from the assembly, while observing the position of the cutter assembly.

According to one aspect of the invention as disclosed in FIG. 4, the housing is partitioned by a wall 85 into an engine compartment 86 enclosing the power cylinder 58 forward of the rear control handle 35 and a fuel compartment 88 disposed beneath the control handle 35 and rearwardly of the engine compartment. This arrangement establishes maximum separation of the gas tank from the exhaust and the heat radiating portions of the power cylinder. Additionally, this location of the fuel tank is consistent with the desired location of the assembly center of gravity which is preferably between and below the forward and rear hand grips as discussed above. Further, the fuel fill port 89 permits easy filling while the unit is laying on one side.

Figure 5:
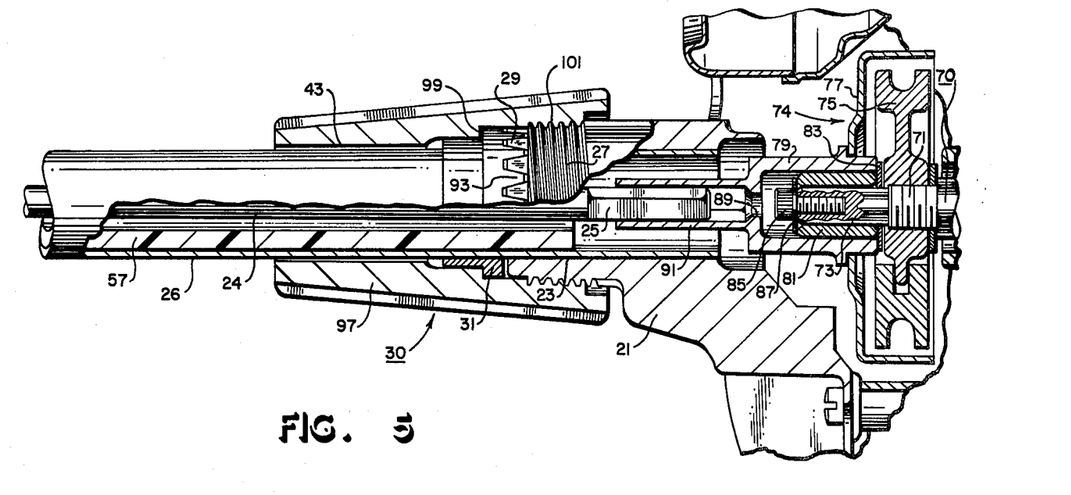
FIG. 5 is an enlarged sectional view similar to FIG. 4 illustrating the power transfer coupling in accordance with the present invention.

Referring now to FIG. 5, a centrifugal clutch is mounted directly on the forward end of the crankshaft 70, which is provided with a first threaded section 71 and a smooth bearing section 73 of lesser diameter. The centrifugal shoe member 75 of a conventional centrifugal clutch 74 is threaded onto the threads 71 of the shaft 70. The threads 71 are disposed in a direction such that the rotation of the shaft maintains the shoe assembly 75 tight. The drum 77 of the clutch is rigidly attached to a coupling sleeve 79 which is rotatably journaled on the section 73 of shaft 70 by a bushing type bearing 81. The bearing 81 retained within the sleeve by a washer 83 affixed to the end of the sleeve. Before the bushing 81 is inserted into the sleeve 79, a socket head cap screw 85 and washer 87 are placed in the bore of the sleeve 79. The screw 85 is then threaded into the end of the shaft 73 by inserting a hex head wrench through the opening 89 in the end of the coupling sleeve 79. The sleeve 79 terminates in a square drive socket 91 which slidably receives the squared drive section 25 of the drive shaft of the implement, as will presently be described. A boss 21 is rigidly attached to and forms a forward portion of the housing 20. The boss 21 forms a bore 23 which is concentric with the axis 28 of the drive shaft. The exterior of the boss 21 has a threaded section 27 and the extreme end is formed into a series of tooth-shaped detents 29.

As previously mentioned, the coupling 30 attaches the flexible line trimming implement 16 to the power handle 18. The flexible drive shaft 24, which may be what is commonly referred to as a spiral-wound cable, has a four sided drive section 25 which may be slidably received in the four sided drive socket 91. The tubular housing 26 is slidably received in semi-tight fit within the bore 23. A retaining ring 31 is fixed on the tubular housing 26 and has tooth-shaped detents 93 which mate with the detents 29 on the boss 21. A collar 97 has an internal shoulder 99 which engages the retaining ring 31, and internal threads 101 which may be threaded onto the threaded section 27 of the boss 21. The collar 97 has exterior longitudinal extending grooves to facilitate gripping with a hand, and also has an elongated section 43 which relatively closely receives the shaft housing 26 to lend additional mechanical support. By partially loosening the collar 97, the tooth-shaped detents 93 can be withdrawn from the detents 29, and the rotational position of the shaft housing 26 relative to the power handle assembly 18 adjusted to change the position of the cutting head as desired. It will be noted that substantially any implement requiring rotary power can be attached to the power handle by providing mating threads for the threaded section 27 on the boss disposed in the proper relation to a squared drive shaft section to be received in the drive socket 91. In such an implement, inclusion of the extension of the tubular housing 26 into the bore 23 of the boss may or may not be required, and the toothed detents may also be eliminated where relative position of the power handle to the implement is not required.

Figures 6, 7, 8, 9, 10:
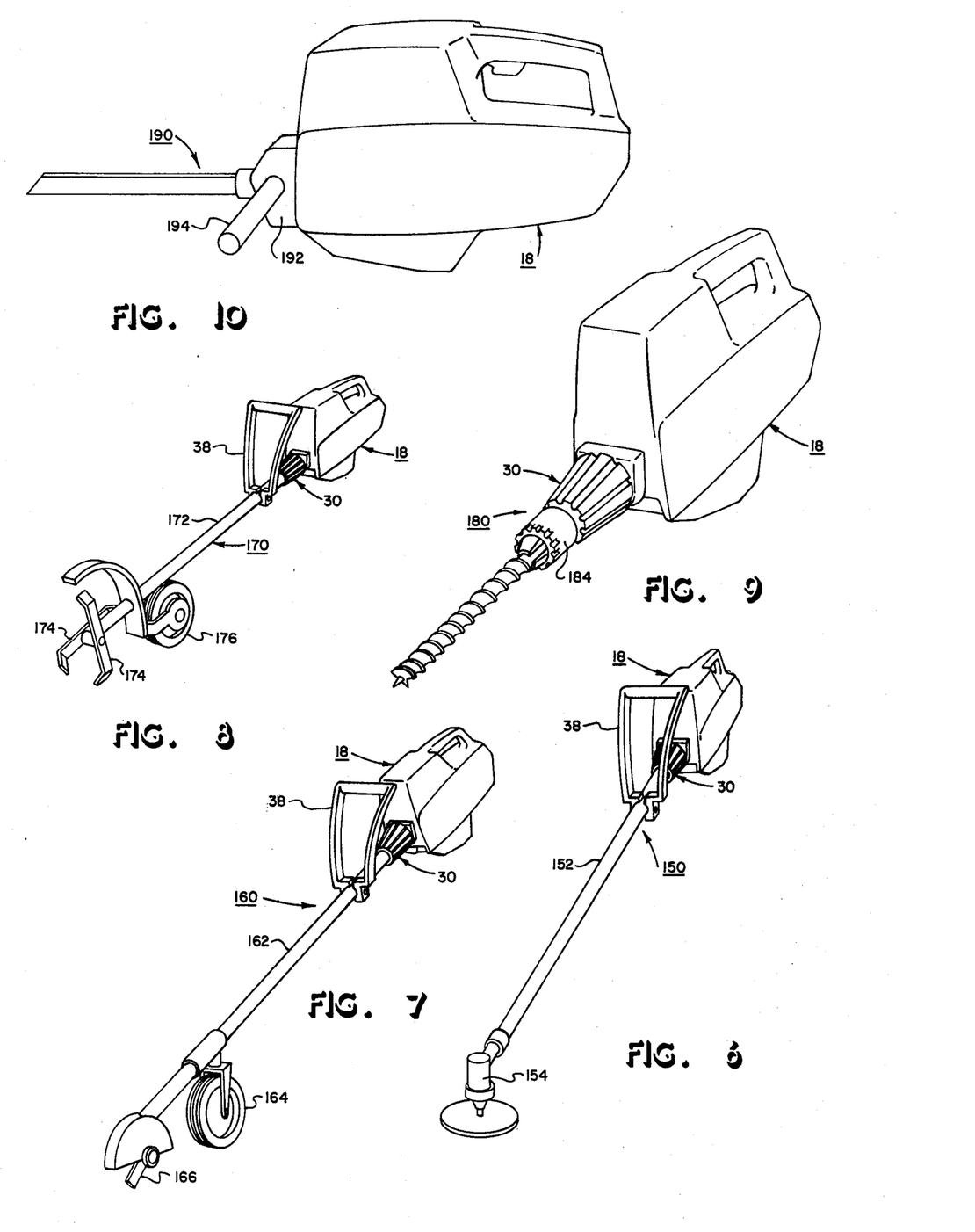
FIG. 6 is a perspective view of the power handle assembly of FIG. 4 attached to a brush cutting implement.
FIG. 7 is a perspective view of the power handle assembly of FIG. 4 attached to an edging implement.
FIG. 8 is a perspective view of the power handle assembly of FIG. 4 attached to a cultivating implement.
FIG. 9 is a perspective view of the power handle assembly of FIG. 4 attached to a drilling implement.
FIG. 10 is a perspective view of the power handle assembly of FIG. 4 attached to a sawing implement.

In accordance with an important aspect of the invention, various attachments may be coupled to the power handle to provide a wide assortment of useful implements. For example, a conventional solid disc brush cutter attachment 150 with a toothed edge blade for cutting heavy brush and small trees is illustrated in FIG. 6 may be coupled to the power handle assembly by a standard coupling 30. A front handle 38 may be identical to that previously described and designated by the same reference characters. The drive shaft 152 may be substantially the same design with a lower conventional brush cutting unit 154, including a reduction gear box with approximated a sixty degree turn in the drive train.

An attachment for connection to the power handle assembly 18 to produce a lawn edger is indicated generally by the reference numeral 160 in FIG. 7. This implement also includes the standard coupling 30, handle 38, and a drive shaft assembly 162. A gauge wheel 164 is also provided to control the depth of the cut, and a conventional vertically disposed, rotating, blade type edging cutter 166 may be provided for edging grass along sidewalks and curbs.

Another implement in accordance with the present invention which may be attached to the power handle 18 is a light duty cultivator indicated generally by the reference numeral 170 in FIG. 8. The cultivator 170 includes the standard coupling 30 and a suitable drive shaft 172 which drives a number of tiller blades 174 through a conventional gear arrangement. A gauge wheel 176 is again provided to control the depth of cultivation.

A boring attachment 180 is illustrated in FIG. 9 as being attached to the power handle by the conventional coupling 30, in which case only a retainer and thrust bearings need be provided in the shaft housing 26 for a conventional drill chuck 184.

Figure 11:
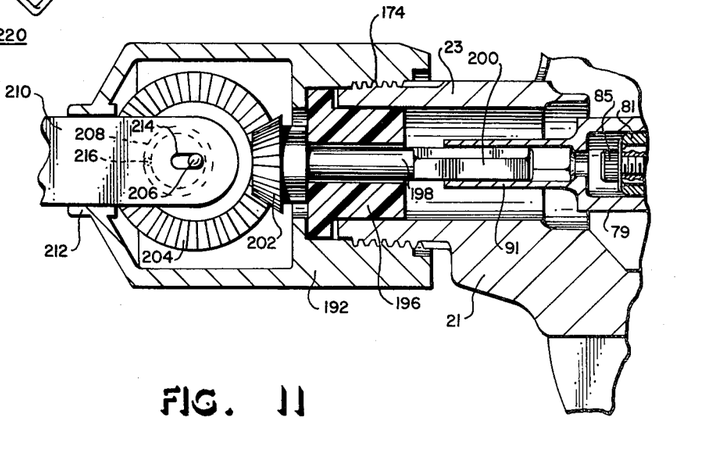

FIG. 10 illustrates the use of the power handle 18 to drive a power hacksaw implement 190. The hacksaw implement 190 includes a housing 192 to which a handle 194 may be attached. The housing 192 may include the necessary mechanism for conversion of rotary to reciprocating motion as illustrated in FIG. 11. The housing 192 includes threads 194 for connecting the housing to the threaded section on boss 21 of the power handle housing 20. The implement housing 192 includes a shoulder which holds a thrust bearing sleeve 196 inside the bore 23. The sleeve 196 may include detents for engaging tooth-shaped detents 29 and prevent the sleeve from rotating in the bore. A drive shaft 198 is journaled in sleeve 196 and has a squared section 200 which is received in the squared drive socket 91 at the rear end, and a bevel gear 202 at the forward end. A second bevel gear 204 meshes with gear 202 and is journaled on an axle 206 in the implement housing 192. Gear 204 has a groove 208 (shown in dotted outline) which is eccentric to the axle 206. A saw blade 210 is slidably supported in a bearing 212 formed by the housing 192 and has a slot 214 which embraces the axle 206 and a pin 216 (shown in dotted outline) which is received in the eccentric groove 208. Thus as the gear 204 is rotated by gear 202 and shaft 198, the blade 210 reciprocates as the pin 216 follows the eccentric grooves 208. This basic system can be used to attach substantially any implement to and drive the implement from the power handle assembly.

Figure 12:
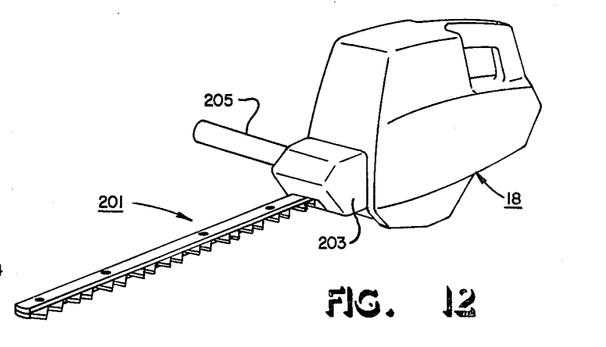
FIG. 12 is a perspective view of the power handle assembly of FIG. 4 attached to a hedge trimming implement.

The power handle 18 is shown attached to a hedge clipping implement 200 in FIG. 12. The implement 200 may include a housing 203, which may include substantially the same drive mechanism shown in FIG. 11, and a handle 205.

Figure 13:
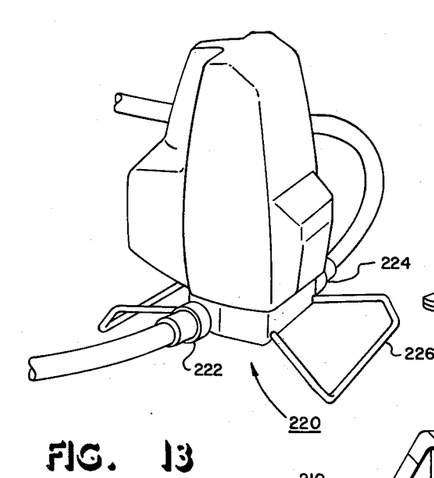
FIG. 13 is a perspective view of the power handle assembly of FIG. 4 attached to an implement for pumping water.

Still another implement in accordance with this invention is a water pump indicated generally by the reference numeral 220 in FIG. 13. The water pump is a conventional centrifugal pump having inlet and outlet ports 222 and 224 and a suitable base 226 for supporting the pump and power handle assembly on a flat surface. The pump housing may be coupled directly to the boss 21 with a squared drive shaft inserted in drive socket 91, substantially as previously described. This implement is exemplary of air compressors, air blowers, and electrical generators which may be coupled to and driven by the power handle assembly 18 of the present invention.

It will be appreciated that the above illustrated and described invention provides a novel power handle configuration which may be used to good advantage for delivering rotary power through an elongated drive shaft for a number of different portable power tool applications. The power handle assembly is particularly well suited for driving a flexible line trimmer for cutting vegetation, but it may also be used to good advantage for a brush cutter having a rigid blade, and as a lawn edger. The power unit may also be used for driving a hedge trimmer, snow blower, power hacksaw, circular saw, chain saw, water pump, or for driving a generator, as examples. The apparatus of the invention provides a compact, highly efficient synergistic relationship of elements which perform a multiplicity of functions, and which provides a compact assembly which is portable and easily manipulated because of the improved balance features. Additionally, the narrow profile, elongated, forward mounted power handle assembly provides safety features related to exposure to the hot exhaust gases and the starting and control of an internal combustion drive motor. The safety features relating to drive motor control and the improved maneuverability feature relating to the center of gravity and balance of the assembly are equally applicable in either a gas powered internal combustion drive motor arrangement or in an electric drive motor arrangement.

Although the invention has been described with reference to a preferred embodiment, it will be appreciated by those skilled in the art that additions, deletions, modifications, substitutions and other changes not specifically described and illustrated in these embodiments may be carried out to achieve the objects of the invention and fall within the scope and spirit of the appended claims.

What is claimed is:

1. A portable power tool comprising a rotary head coupled to one end of an elongated tubular drive shaft assembly and an internal combustion engine coupled to the opposite end of the drive shaft assembly, an elongated housing enclosing the internal combustion engine, the housing including a rear handle having a hand grip portion disposed above and projecting rearwardly along the top of the housing, a muffler communicating with the exhaust port from the internal combustion engine and disposed along the forward face of the housing for discharging products of combustion forwardly of the housing, and a forward handle attached to the tubular drive shaft assembly having a hand grip portion disposed substantially above the discharge path of the products of combustion.

2. The combination as defined in claim 1, said forward handle comprising first and second struts each secured at one end to the drive shaft assembly and projecting transversely with respect to the drive shaft assembly on either side of the muffler discharge path, the opposite ends of said struts being connected to said hand grip portion.

3. A narrow profile power handle assembly comprising an elongated housing including a control handle disposed above and projecting rearwardly parallel to the longitudinal axis of the housing, and a internal combustion engine enclosed within the housing having a cylinder with an axis, a piston reciprocably disposed in the cylinder for movement alternately through compression and power strokes, a crankcase, a crankshaft coupled to the piston and projecting through the crankcase along the longitudinal axis of the housing wherein the crankshaft, cylinder and control handle are substantially symmetrically disposed relative to the plane defined by the intersection of the longitudinal axis of the housing and the longitudinal axis of the cylinder.

4. The narrow profile power handle assembly as defined in claim 3, including means partitioning the housing into an engine compartment enclosing the crankcase and cylinder forward of the control handle and a fuel compartment disposed beneath the control handle and rearwardly of the engine compartment.

5. The narrow profile power handle assembly as defined in claim 3 wherein the cylinder includes an exhaust port and a muffler connected to the exhaust port and disposed in front of the cylinder for discharging products of combustion forwardly of the housing along a path generally parallel with the longitudinal axis of the housing.

6. The narrow profile power handle assembly as defined in claim 3 wherein the housing includes a combustion air intake port formed along the lower face of the housing behind the engine, said engine having a carburetor disposed below the crankcase and in communication with the intake port connected to receive the combustion air, and a removable air filter assembly disposed in the intake port.

7. The narrow profile power handle assembly as defined in claim 3 wherein the housing includes ventilation air inlet openings a plurality of ventilation blades connected to the crankshaft for drawing cooling air through the inlet openings, a muffler communicating with the exhaust port of the cylinder, and a ventilation discharge opening formed between the housing and the periphery of the muffler whereby engine cooling air is drawn through the inlet openings and is discharged around the cylinder and around the muffler through the ventilation discharge opening in response to rotation of the ventilation blades.

8. The narrow profile power handle assembly as defined in claim 3 wherein said power cylinder projects vertically above and a carburetor projects vertically below the longitudinal axis of the drive shaft.

9. The system for coupling the drive shaft of a prime mover disposed in a drive unit housing to an implement having a power input shaft journaled in an implement housing which comprises:

a centrifugal clutch having a centrifugal shoe assembly disposed within a drum assembly, the shoe assembly being fixed on the drive shaft and the drum assembly being rotatably journaled on the drive shaft outboard of the shoe assembly, drive coupling means connected to the drum assembly and axially aligned with the end of the drive shaft for coupling the drum assembly to the power input shaft of an implement axially aligned therewith, and support coupling means on the drive unit housing for detachably connecting an implement housing to the drive unit housing.

10. The system of claim 9 further comprising an implement having a power input shaft coupled to the drive coupling means and a housing connected to the support coupling means for support.

11. The system of claim 9 wherein
the prime mover is an internal combustion engine having a crankshaft,
the shoe assembly is secured on the crankshaft adjacent the crankcase,
the drum assembly is disposed around the shoe assembly and rotatably journaled on a portion of the crankshaft extending beyond the shoe assembly by a bearing disposed within and connected to a tubular hub, the drive coupling means is a drive socket connected to the hub and coaxial with the crankshaft, the bearing drum assembly and drive socket being retained on the end of the crankshaft by a fastener threaded into the end of the crankshaft.

12. The system of claim 9 wherein the drive coupling means is a tubular drive socket having an obround cross section and the support coupling means comprises a tubular section coaxial with the drive socket.

13. The system of claim 12 wherein the tubular drive socket has a polygonal cross section and the support coupling means comprises a tubular boss formed on the drive unit housing, and the threaded section is formed on an exterior surface of the boss.

14. The system of claim 13 further comprising an implement having a power input shaft slidably engaging the drive socket, and a housing threadably connected to the threaded section on the boss.

15. The system of claim 14 wherein the boss forms a cylindrical bore coaxial with the drive socket and the implement includes bearing means disposed within the bore and at least partially supported by the boss.

16. The system of claim 15 wherein the implement includes a tubular housing the end of which is disposed within the bore of the boss and an interiorly threaded sleeve disposed around the tubular housing and threaded onto threaded section of the boss to retain the tubular housing within the bore.

17. The system of claim 16 wherein the boss and the tubular housing each include cooperating detent means for securing the tubular housing in at least two nonrotating positions within the bore.

18. An implement for attachment to a portable power unit having an internal combustion engine driving a drive socket and a power unit housing having a tubular boss disposed coaxially with the drive socket, the tubular boss having a cylindrical interior bore and an exterior threaded section and detent means on the end thereof, the implement including an implement housing including means for threadedly engaging the exterior threads on the boss to secure the implement housing to the power unit housing, and a drive shaft journaled in the implement housing for engagement by the drive socket.

19. The implement of claim 18 wherein the implement housing further includes a tubular section for insertion in the cylindrical portion of the boss and a collar rotatably disposed on the tubular portion and threadably onto the threaded section of the boss to secure the housing in the bore.

20. The implement of claim 18 wherein the tubular section of the housing is long with respect to its cross section and supports a rotary cutting tool, and the drive shaft extends through the tubular housing to the rotary cutting tool.

21. The implement of claim 19 further comprising detent means on the tubular section of the housing for cooperatively engaging the detent means on the end of the tubular boss for selectively positioning the implement housing in at least two fixed positions when the collar is threadedly connected to the boss.

22. The implement of claim 18 wherein the implement housing includes means for converting rotary motion to reciprocating motion.

23. The implement of claim 18 wherein the implement housing includes means for supporting the implement and a portable power unit to which it is coupled on a supporting surface when the portable power unit is coupled to the implement.

24. A portable power unit for driving implements comprising
an internal combustion engine including a crankcase, a crankshaft rotatably journaled in the crankcase and defining a longitudinal axis with front and rear ends, a cylinder connected to one side of the crankcase having an axis transverse to the longitudinal axis which together with the longitudinal axis defines a plane, a piston reciprocally disposed in the cylinder and operatively coupled to the crankshaft, a carburetor generally centered on the plane on the opposite side of the crankcase from the cylinder and in fluid communication with the crankcase, a muffler communicating with an exhaust port from the cylinder and disposed forewardly of the cylinder and generally centered on the plane and directing exhaust gases forwardly from the housing,
a centrifugal clutch having a power input member coupled to the forward end of the crankshaft and a power output member extending coaxially from the crankshaft,
drive coupling means connected to the power output member for coupling the power output member to drive an implement,
starter means operatively engaging the rear end of the crankshaft, and
a housing enclosing the engine, clutch and starter means including a handle generally centered on the plane and disposed above the longitudinal axis and to the rear of the transverse axis.

25. The portable power unit of claim 24 wherein the drive coupling means comprises
drive socket means for slidably receiving and driving an implement power input shaft, and wherein
the housing includes a tubular boss having a threaded section coaxial with the drive socket means for connection to the housing of an implement.

26. The portable power unit of claim 25 wherein the boss forms a cylindrical bore disposed coaxially with the threaded section.

27. The portable power unit of claim 26 wherein the end of the boss forms detent means for cooperatively engaging an implement to selectively hold the implement in at least two positions relative to the housing.

28. A muffler for an internal combustion engine comprising an external shell having opposed first wall and second wall and a plurality of restrictive exhaust jets formed around the peripheral wall therebetween, a first tubular member forming a central exhaust inlet passageway extending through the first wall to a point adjacent the second wall, the tubular means terminating a short distance from the second wall to provide a peripheral passageway between the tubular means and the second wall having a cross sectional area less than the cross sectional area of the tubular means to thereby form a venturi effect and a reduced pressure to cool and disburse the exhaust gases, and a perforated second tubular member disposed around the first tubular member for diffusing the exhaust gases before the exhaust gases reach the exhaust jets.

29. The muffler of claim 28 wherein the external shell is comprised of first and second mating dish-shaped halves forming the first and second walls respectively, and each having peripheral side walls which cooperatively form the peripheral wall of the shell with the peripheral side wall of the first half partially overlapping the peripheral side wall of the second half with interrupted sections of the overlapped portions being spaced apart to form the exhaust jets, the first tubular member extends through and is attached to the first wall, and the second tubular member extends between the first and second walls.

30. The muffler of claim 29 further including, in combination, an internal combustion engine with the exhaust port from the cylinder coupled to the first tubular member, a cooling air fan driven by the engine, a housing enclosing the engine and fan and at least a portion of the muffler having cooling air inlet ports and forming a shroud for causing cooling air to be drawn in through the cooling air inlet ports by the fan, passed around the cylinder of the engine and around at least a portion of the muffler and then out of the housing, the housing extending at least beyond the exhaust jets from the muffler whereby the exhaust gases from the exhaust jets will be mixed with and cooled by the cooling air before leaving the housing.

31. A portable power tool comprising
a power unit having an internal combustion engine with a crankshaft for outputting power from the engine, and a housing having forward and rear end portions at least partially enclosing the engine,
an elongated shaft assembly having one end coupled to the forward end of the housing and having a driven shaft extending therethrough which is coaxial with and coupled to be driven by the crankshaft,
rotary working means coupled for support to the shaft assembly and coupled to be driven by the driven shaft, and
rear handle means coupled to the rear end portion of the housing means and forward handle means coupled to the tool forward of the internal combustion engine and above the shaft assembly, the center of gravity of the power unit, shaft assembly and working means being situated below and between the rear and front handles;
the power unit including a system for directing the gases of combustion forwardly from the power unit below the forward handle means.

32. The combination as defined in claim 31 wherein the internal combustion engine includes a cylinder, a piston reciprocably mounted within the bore of the cylinder for movement alternately through compression and power strokes, and a crankcase enclosing the crankshaft and a connecting rod coupling the crankshaft to the piston, the crankshaft, bore of the cylinder and rear hand grip portion are each generally disposed within the plane defined by the intersection of the axis of the crankshaft and the longitudinal axis of the bore of the cylinder.

33. The combination as defined in claim 32, wherein said cylinder projects vertically above the longitudinal axis of the crankshaft, and further including means partitioning the housing into an engine compartment enclosing said power cylinder forward of the rear handle and a fuel compartment disposed beneath the rear handle and rearwardly of the engine compartment.

34. The combination as defined in claim 31, further comprising ventilation air inlet openings formed in the housing, said internal combustion engine having a power cylinder and a piston reciprocably mounted within the bore of the cylinder for movement alternately through compression and power strokes a plurality of fan blades connected to the crankshaft for drawing cooling air through the ventilation air inlet openings, a muffler communicating with the exhaust port from the cylinder, and a ventilation air discharge opening formed between the housing and the periphery of the muffler whereby engine cooling air is drawn through the inlet openings and is forced around the cylinder, around the muffler and out through the ventilation discharge opening in response to rotation of the fan blades.

35. The combination of claim 34 wherein the exhaust gases from the muffler are injected into the ventilation air before the ventilation air leaves the housing.

36. The combination as defined in claim 31 wherein said prime mover comprises a two-stroke internal combustion engine characterized by relatively low speed, high torque output, and said rotary vegitation trimming assembly.

37. The combination as defined in claim 31, wherein the internal combustion engine includes a scavenging crankcase and a carburetor coupled to said crankcase, and the housing includes a combustion air intake port formed along the lower portion of the housing, and a removable air filter assembly disposed in the air flow path intermediate the intake port and the carburetor.

38. An implement for attachment to a portable power unit having an internal combustion engine driving a drive socket and a power unit housing having a tubular boss disposed coaxially with the drive socket, the tubular boss having a cylindrical interior bore and means for securing a tubular implement housing therein, the implement including an implement housing for insertion in the tubular boss to secure the implement housing to the power unit housing, and a drive shaft journaled in the implement housing and positioned for engagement within the drive socket.

39. The implement of claim 38 wherein the tubular section of the housing is long with respect to its cross section and supports a rotary cutting tool, and the drive shaft extends through the tubular housing to the rotary cutting tool.

* * * * *